(12) United States Patent
Choudhury et al.

(10) Patent No.: US 11,303,565 B2
(45) Date of Patent: *Apr. 12, 2022

(54) TRAFFIC MATRIX PREDICTION AND FAST REROUTE PATH COMPUTATION IN PACKET NETWORKS

(71) Applicant: AT&T Intellectual Property I, L.P., Atlanta, GA (US)

(72) Inventors: Gagan Choudhury, Jackson, NJ (US); Gaurav Thakur, Matawan, NJ (US); Simon Tse, Holmdel, NJ (US); Kathleen Meier-Hellstern, Cranbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,786

(22) Filed: Oct. 12, 2020

(65) Prior Publication Data

US 2021/0029030 A1 Jan. 28, 2021

Related U.S. Application Data

(63) Continuation of application No. 16/806,837, filed on Mar. 2, 2020, now Pat. No. 10,805,214, which is a (Continued)

(51) Int. Cl.
*H04B 10/00* (2013.01)
*H04L 45/00* (2022.01)
(Continued)

(52) U.S. Cl.
CPC .......... *H04L 45/70* (2013.01); *H04L 43/0882* (2013.01); *H04L 45/50* (2013.01);
(Continued)

(58) Field of Classification Search
CPC .......... H04B 10/0775; H04B 10/07955; H04B 10/0793; H04B 10/07; H04B 10/0795;
(Continued)

(56) References Cited

U.S. PATENT DOCUMENTS 5,719,854 A * 2/1998 Choudhury ........... G06F 9/5027
370/231
6,532,088 B1 * 3/2003 Dantu ................. H04J 14/0227
370/223

(Continued)

OTHER PUBLICATIONS

Two Use Cases of Machine Learning for SDN-Enabled IP/Optical Networks: Traffic Matrix Prediction and Optical Path Performance Prediction. Gagan Choudhury, David Lynch, Gaurav Thakur and Simon Tse. May 18, 2018 (Year: 2018).*

(Continued)

*Primary Examiner* — Hibret A Woldekidan (57) ABSTRACT

A processing system including at least one processor may obtain traffic measurements for end-to-end paths in a telecommunication network, calculate traffic estimates for the end-to-end paths in future time periods based on the traffic measurements in accordance with at least one machine learning model, calculate traffic estimates for primary paths in the telecommunication network based upon the traffic estimates for the end-to-end paths, compute a backup path configuration for a primary path of the telecommunication network for the future time periods based upon the traffic estimates for the primary paths in the future time periods, detect a change in the backup path configuration for the primary path in a future time period based upon the computing, and adjust a backup path in accordance with the backup path configuration when the change in the backup path configuration is detected.

20 Claims, 6 Drawing Sheets

Related U.S. Application Data continuation of application No. 16/189,786, filed on Nov. 13, 2018, now Pat. No. 10,581,736.

(51) Int. Cl.
*H04L 45/64* (2022.01)
*H04L 43/0882* (2022.01)
*H04Q 11/00* (2006.01)
*H04L 45/50* (2022.01)

(52) U.S. Cl.
CPC ......... *H04L 45/64* (2013.01); *H04Q 11/0062* (2013.01); *H04Q 2011/0081* (2013.01)

(58) Field of Classification Search
CPC ..... H04B 10/27; H04L 45/70; H04L 43/0882; H04L 45/50; H04L 45/64; H04L 45/22; H04L 45/28; H04L 47/788; H04Q 11/0062; H04Q 2011/0081; H04Q 2011/0086; H04Q 11/0005; H04Q 2011/0064; H04J 14/0267; H04J 14/0291
USPC .............................................. 398/1–5, 25, 45
See application file for complete search history.

(56) References Cited

U.S. PATENT DOCUMENTS

| | | | | |
|---|---|---|---|---|
| 7,167,443 | B1 * | 1/2007 | Dantu | H04L 12/437 370/218 |
| 7,400,583 | B2 * | 7/2008 | Friskney | H04L 41/5009 370/235 |
| 7,577,091 | B2 * | 8/2009 | Antal | H04L 41/5054 370/229 |
| 7,859,993 | B1 * | 12/2010 | Choudhury | H04L 41/0681 370/217 |
| 8,150,257 | B1 * | 4/2012 | Choudhury | H04L 41/0681 398/175 |
| 8,681,654 | B2 | 3/2014 | Klincewicz et al. | |
| 8,705,954 | B2 * | 4/2014 | Singla | H04J 14/0204 398/14 |
| 8,909,042 | B2 * | 12/2014 | Oki | H04B 10/299 398/57 |
| 8,934,768 | B2 * | 1/2015 | Bottari | H04B 10/27 398/25 |
| 9,178,796 | B2 | 11/2015 | Previdi et al. | |
| 9,197,508 | B2 | 11/2015 | Vasseur et al. | |
| 9,396,651 | B2 * | 7/2016 | Joseph | G08G 1/0112 |
| 9,412,267 | B2 * | 8/2016 | Joseph | G08G 1/0112 |
| 9,438,472 | B2 * | 9/2016 | Csaszar | H04L 45/22 |
| 9,444,727 | B2 | 9/2016 | Vasseur et al. | |
| 9,800,495 | B2 * | 10/2017 | Lu | G06F 11/1415 |
| 9,800,506 | B2 | 10/2017 | Vasseur et al. | |
| 9,853,884 | B2 | 12/2017 | Lee et al. | |
| 9,923,832 | B2 * | 3/2018 | Wetterwald | H04L 47/2441 |
| 10,039,046 | B2 | 7/2018 | Hui et al. | |
| 10,075,390 | B2 | 9/2018 | Karthikeyan et al. | |
| 10,298,329 | B1 * | 5/2019 | Choudhury | H04J 14/021 |
| 10,462,042 | B2 * | 10/2019 | Bajaj | H04L 43/08 |
| 10,686,544 | B2 * | 6/2020 | Birk | H04J 14/0212 |
| 2005/0208949 | A1 * | 9/2005 | Chiueh | H04L 45/125 455/452.2 |
| 2008/0175587 | A1 * | 7/2008 | Jensen | H04L 1/22 398/2 |
| 2011/0064407 | A1 * | 3/2011 | Gerstel | H04J 14/0221 398/45 |
| 2012/0008944 | A1 * | 1/2012 | Singla | H04J 14/0204 398/45 |
| 2013/0142508 | A1 * | 6/2013 | Bottari | H04J 14/02 398/26 |
| 2015/0016242 | A1 * | 1/2015 | Ernstrom | H04L 45/122 370/218 |
| 2015/0043905 | A1 * | 2/2015 | Graves | H04Q 11/0062 398/25 |
| 2015/0312658 | A1 * | 10/2015 | Winzer | H04L 45/22 398/5 |
| 2017/0019312 | A1 | 1/2017 | Meyer et al. | |
| 2018/0176933 | A1 | 6/2018 | Zhang | |

OTHER PUBLICATIONS

Gagan Choudhury, David Lynch, Gaurav Thakur and Simon Tse. May 18, 2018, Two Use Cases of Machine Learning for SDN-Enabled IP/Optical Networks: Traffic Matrix Prediction and Optical Path Performance Prediction. (Year: 2018).

* cited by examiner

|          | ROUTER 301 | ROUTER 302 | ROUTER 303 | ROUTER 304 |
|----------|------------|------------|------------|------------|
| ROUTER 301 | 0        | 50         | 90         | 30         |
| ROUTER 302 | N/A      | 0          | 0          | 30         |
| ROUTER 303 | N/A      | N/A        | 0          | 40         |
| ROUTER 304 | N/A      | N/A        | N/A        | 0          |

420

|          | ROUTER 301 | ROUTER 302 | ROUTER 303 | ROUTER 304 |
|----------|------------|------------|------------|------------|
| ROUTER 301 | 0        | 40         | 50         | 30         |
| ROUTER 302 | N/A      | 0          | 0          | 90         |
| ROUTER 303 | N/A      | N/A        | 0          | 20         |
| ROUTER 304 | N/A      | N/A        | N/A        | 0          |

TRAFFIC MATRIX PREDICTION AND FAST REROUTE PATH COMPUTATION IN PACKET NETWORKS

This application is a continuation of U.S. patent application Ser. No. 16/806,837, filed Mar. 2, 2020, now U.S. Pat. No. 10,805,214, which is a continuation of U.S. patent application Ser. No. 16/189,786, filed Nov. 13, 2018, now U.S. Pat. No. 10,581,736, both of which are herein incorporated by reference in their entirety.

The present disclosure relates generally to telecommunication network operations, and more particularly to devices, computer-readable media, and methods for computing fast reroute backup path configurations corresponding to associated primary paths for a telecommunication network based upon end-to-end path traffic estimates and primary path traffic estimates for future time periods. For example, a link is a direct connection between two routers. The traffic for each end-to-end path goes over one or more links (determined by a network routing mechanism) and conversely each link may carry traffic from one or multiple end-to-end paths.

BACKGROUND

An important capability in a telecommunication network is the ability to quickly (typically tens of milliseconds) switch traffic from a primary path to a backup path following detection of a failure of a network component (e.g., a link or a node) that takes down the primary path. The traffic on the fast reroute (FRR) backup path only stays there for several seconds until all the end-to-end paths are recomputed to avoid the failed component using either a distributed mechanism by the routers or a centralized mechanism by a SDN controller. Usually a static path is chosen for a FRR backup path. The actual traffic that needs to be carried on such a backup path during a failure event depends on the traffic on the primary path just before it fails, how many other network components have failed at the time of the failure event, and other factors. Since each backup path is pre-computed and the primary path it is protecting may carry traffic from several end-to-end paths (based on the network routing mechanism), it may not be optimal at a later point when called upon to serve as a backup path given changes in traffic conditions at many end-to-end paths at the later point of time.

SUMMARY

In one example, the present disclosure describes an apparatus, computer-readable medium, and method for computing backup path configurations for a telecommunication network based upon end-to-end path traffic estimates and primary path traffic estimates for future time periods. For example, a processing system including at least one processor may obtain a plurality of traffic measurements for a plurality of end-to-end paths in a telecommunication network, calculate traffic estimates for the plurality of end-to-end paths in a plurality of future time periods based on the plurality of traffic measurements in accordance with at least one machine learning model, and calculate traffic estimates for a plurality of primary paths in the telecommunication network based upon the traffic estimates for the plurality of end-to-end paths. The processing system may then compute at least one backup path configuration for at least one primary path of the telecommunication network for the plurality of future time periods based upon the traffic estimates for the plurality of primary paths in the plurality of future time periods, detect a change in the at least one backup path configuration for the at least one primary path in a future time period of the plurality of future time periods based upon the computing, and adjust at least one backup path in accordance with the at least one backup path configuration when the change in the at least one backup path configuration is detected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media and methods for computing a FRR backup path configuration for an associated primary path in a telecommunication network based upon end-to-end path traffic estimates and primary path traffic estimates for future time periods. The traffic for each end-to-end path may be carried by an end-to-end Multi-Protocol Label Switching-Traffic Engineering (MPLS-TE) tunnel and as referred to herein, the terms "end-to-end path" and "end-to-end tunnel" may be used interchangeably. The FRR backup path mentioned above may carry traffic during the failure of the corresponding primary path. In the case of link failure protection, the primary path extends over a single link only. In the case of router failure protection, the primary path extends over two links with the protected router being in the middle. In both cases, the backup path should be diverse from the primary path (since otherwise the failure of the primary path may also cause the backup path to fail) but the endpoints of the backup path should be exactly the same as that of the primary path.

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services.

Advancing SDN architectures also extend to the physical layer, with the introduction of devices such as reconfigurable optical add/drop multiplexers (ROADM) to the optical network, e.g., a wavelength division multiplexing (WDM) network, such as a dense wavelength division multiplexing (DWDM) network. Software-controlled ROADMs manage data traveling over high-capacity fiber optic lines and can automatically detect and adjust bandwidth, move traffic to different optical paths, turn off wavelengths for a variety of different reasons, and so forth. SDN components relating to the physical layer (e.g., optical components) may additionally include transceivers, transponders, muxponders, or the like, as well as optical or electro/optical components of switches (e.g., Ethernet switches), layer 3 switches/multilayer switches, routers (e.g., routers which may also include switching functions), or the like. Similar to other SDN components (e.g., virtual network functions (VNFs) for layer 3 services, application layer services, etc.), these optical components may be turned on and off, and configured and reconfigured at any time. In addition, such components may be installed but remain inactive until an SDN controller determines that the components should be activated for one or more wavelength connections.

An important capability in a packet network is the ability to switch traffic to a backup path (e.g., a Fast Reroute (FRR) backup path, or "bypass tunnel") in response to the detection of a failure along a primary path. This may limit the traffic loss period in the event of a failure and is important for voice, video, gaming, and other real-time critical traffic. In the event of a failure, each backup path must carry all the traffic the associated primary path was carrying just before the failure. The primary path is either single hop (link-failure protection) or two-hop (router-failure protection) and typically it carries traffic for several end-to-end paths (determined by network routing mechanism). The traffic for each end-to-end path can be carried by an end-to-end tunnel. Thus, since each backup path is pre-computed and carries traffic from several end-to-end tunnels, it may not be optimal when subsequently called upon to serve as a backup path in some future time. For example, for each end-to-end tunnel, a second more optimal routing avoiding the failed component may later be established by routers (e.g., distributed traffic engineering (TE)) or by a SDN controller (e.g., centralized TE). The present disclosure addresses the potential for traffic loss when the traffic is on a FRR backup path before being routed on a more optimal end-to-end path.

In some approaches, a static path is chosen for a FRR backup path. The actual traffic that needs to be carried on such a backup path during a failure event depends on the traffic being carried by the associated primary path just before the failure, how many other network elements have failed at the time of the failure event, and so on. If there is insufficient capacity on the backup path during a failure event, traffic losses may result. On the other hand, if too much capacity is kept on the backup path based on a worst possible traffic condition (e.g., maximum traffic during the day), the network infrastructure and operational costs may increase significantly. In addition, such costs may be incurred for a large number of backup paths (e.g., for every possible next-hop path (link failure protection) or next-next-hop path (router failure protection) in the network.

Examples of the present disclosure periodically (e.g., every hour, every fifteen minutes, every 20 minutes, etc.) adjust the next-hop or next-next-hop backup paths using machine-learning-based traffic predictions. Examples of the present disclosure may also include knowledge of future traffic events, such as maintenance events or bandwidth calendaring events scheduled in the near future, to eliminate or reduce traffic losses during a failure event by calculating and implementing more optimal backup paths, while also reducing network costs, and without requiring to keep significant additional capacity in the network.

In one example, the present disclosure predicts elements of an end-to-end path traffic matrix that are highly correlated, and which exhibit complex nonlinear oscillations and seasonal periodicities. For instance, each element of an end-to-end path traffic matrix may be associated with the traffic on an end-to-end path, or tunnel (e.g., an MPLS Traffic Engineering (MPLS-TE) tunnel) between any two nodes in the network, and the entry for each such element may comprise a traffic prediction based upon past traffic measures. In one example, a given end-to-end path's traffic is denoted by $\{x_0, x_1, \ldots, x_N\}$.

For each end-to-end path, the present disclosure forms a statistical model that forecasts the traffic on that end-to-end path for a given forward time horizon $a_T$, such as 20 minutes, one hour, or 24 hours into the future, and so forth. In one example, the present disclosure provides a nonlinear autoregressive model of the form $x_t = f(x_{t-a_1}, x_{t-a_2}, \ldots, x_{t-a_T}) + b + ct + \in_t$, where $\{a_1, \ldots a_T\}$ are pre-specified time lags, $b+ct$ is a linear trend, and $\in_T$ represents Gaussian white noise. In one example, the mapping f is estimated by applying Gaussian process regression (GPR), a Bayesian nonlinear regression model where the number of parameters estimated grows with the amount of data. GPR, also known as Kriging, models f as a realization of a Gaussian process with a covariance kernel function formed from the observed data. The posterior estimate $E(x_t|f)$ under the model has an explicit formula in terms of the training data, and can be used to make out-of-sample predictions. GPR can also be viewed as a probabilistic formulation of kernel regression and provides Bayesian credible intervals (error bars) on any forecasts, which may be helpful in interpreting the results. In comparison to a linear autoregressive (AR) or moving average (MA) model, a GPR model is better able to capture the asymmetry between the rising and falling parts of daily oscillations.

In one example, the present disclosure may include detrending the time series with a linear regression, and then regressing $\{x_{t-a_1}, x_{t-a_2}, \ldots, x_{t-a_T}\}$ on $x_t$ for all t such that both t and $t-a_T$ lie within the training period. It should be noted that GPR is typically applied to a time series by regressing t on $t-a_T$ for all times t in the training dataset. However, this approach requires more detailed prior knowledge of the data to specify a good kernel function (part of the GPR model), and also lacks a direction of time or notion of causality in the model. As a result, this approach performs worse than the lagged approach described above. GPR may also have better out-of-sample prediction accuracy than other regression models including penalized linear models, boosted decision trees, and random forests.

In practice, the choice of lags $\{a_1, \ldots a_M\}$ affects the model's accuracy. For example, specifying too few lags may fail to capture longer term dependencies in the model, while having too many lags may result in a large parameter space where f may not be estimated efficiently. For example, GPR may become less accurate for data with a large number of features. In one example, lags are chosen by applying a heuristic based on the partial autocorrelation $\rho_t$ of the data. In one example, this is done for each end-to-end path (tunnel) separately, using its own past history, and for a range of different forward time horizons $a_T$. For instance, in one example, the range of different lags may be from 1 hour to 168 hours (one week).

The partial autocorrelation is defined by $\rho_t = corr(x_0, x_t | \{x_1, x_2, \ldots, x_{t-1}\})$, and represents the amount of extra correlation at time lag t after accounting for the correlation at all smaller lags. In one example, $\rho_t$ is computed over the training period, and those lags where $\rho_t > a_T^{1/6}/15$ are chosen for inclusion in the model. Notably, for small $a_T$ (say, one hour ahead), the mapping f is easier to estimate. Thus, a higher dimensional model with more lags may be utilized. However, for large $a_T$ (e.g., one week ahead), the mapping f is noisier. Thus, a lower dimensional model (with less lags) may be used to compensate. Similarly, the paths with higher activity may have different characteristics than the ones with lower activity, and may result in a different choice of lags.

In one example, the traffic measurements for an end-to-end path at the selected time lags may then be applied to the nonlinear autoregressive model to predict the end-to-end path traffic at a future time period $a_T$. In addition, this may be repeated for a plurality of additional paths to complete an end-to-end path traffic matrix for the future time period $a_T$. In one example, a primary path traffic matrix (broadly a "primary path traffic vector," such as a link traffic vector) may then be calculated from such an end-to-end path traffic matrix. For instance, a routing engine may maintain an end-to-end path map identifying different end-to-end paths in the network (e.g., a topology information block (TIB) of a path computation element (PCE)), and for each end-to-end path: the beginning and ending nodes, any intermediate nodes and/or links in the path, and so forth. For instance, an end-to-end path traffic matrix for a telecommunication network (e.g., an IP network over an optical transport network) may include more than 5000 entries, each entry representing end-to-end traffic between two nodes (e.g., switches and/or router) in the network. Since it is beneficial to know how much traffic goes over a backup path during a failure, the system is also interested in computing a primary path traffic vector. For link failure protection, the primary path is over one link and for router failure protection, the primary path is over two links with the protected router in the middle. The present disclosure explains how to compute the link traffic vector (whose elements are the traffic on an individual link) but a similar computation may be done in the router failure protection case as well. The network routing mechanism determines how each end-to-end path is routed over one or more links and so once the system has the end-to-end path traffic matrix, it can be used to compute the link traffic vector. Since not all endpoint routers are directly connected by links, the number of links is usually less than the number of end-to-end paths. However, the link traffic vector can still have several hundred elements. A traffic prediction for a given link at a future time period $a_T$ may be calculated as the sum of traffic predictions for the future time period $a_T$ for all end-to-end paths which include the link, where the identification of end-to-end paths which include the link may be determined from the mapping maintained by the routing engine.

As mentioned above, examples of the present disclosure periodically adjust backup paths in the network using machine-learning-based knowledge of future traffic pattern changes (using one or more future predicted traffic matrices), and also using current network conditions plus the knowledge of maintenance events or bandwidth calendaring events scheduled in the near future. In addition to being able to reroute over fixed IP links, the flexibility of CD ROADM (colorless-directionless reconfigurable optical add-drop multiplexers) and DFCC (dynamic fiber cross connects) may be used to create new IP links, delete or reroute an existing IP link based on changing network and traffic conditions, and so on. Machine learning predictions of one or more future traffic matrices as described herein allow this to be accomplished in a proactive manner rather than in a reactive manner. These and other aspects of the present disclosure are discussed in greater detail below in connection with the examples of FIGS. 1-6.

Figure 1:
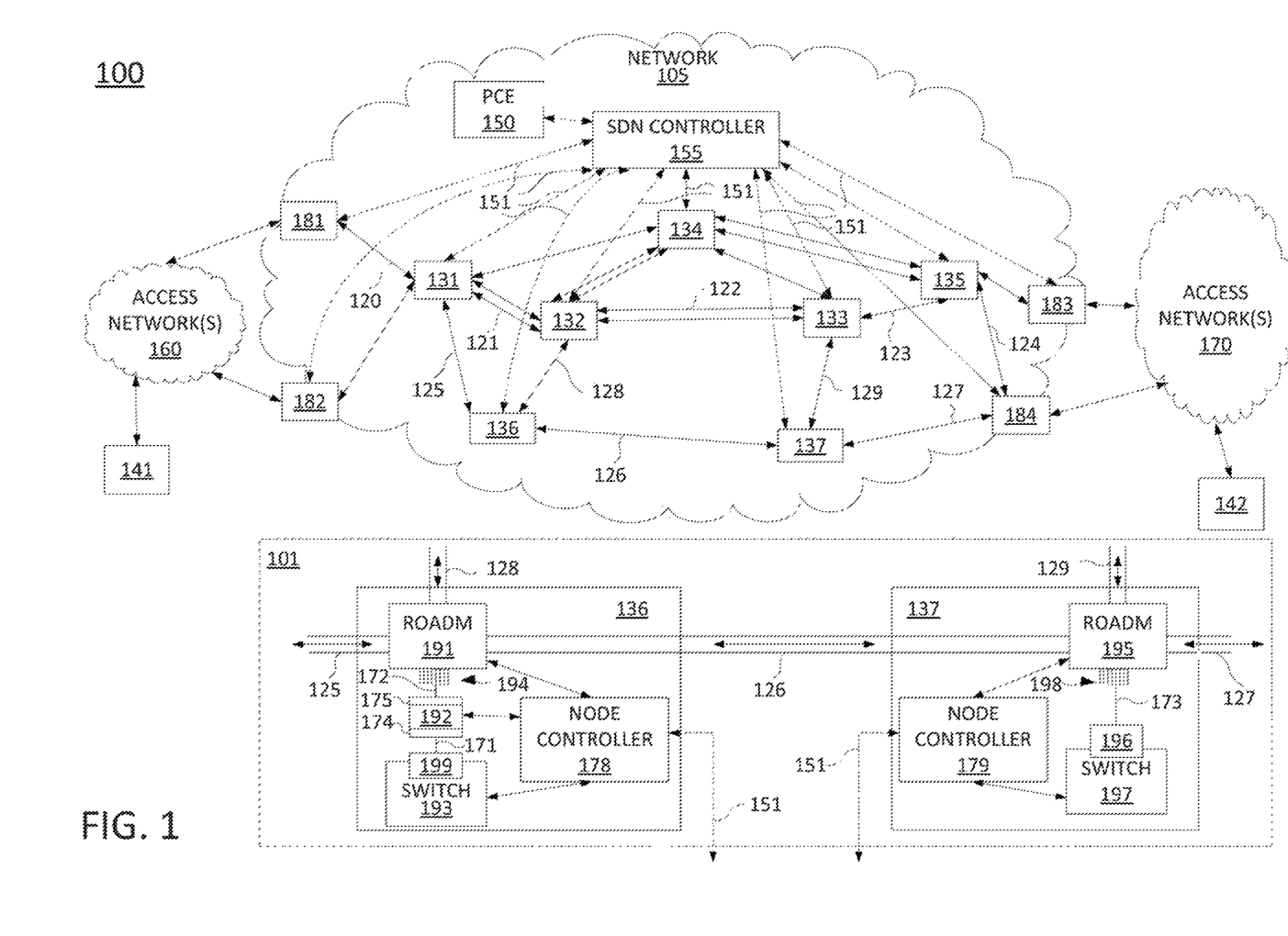
FIG. 1 illustrates an example system related to the present disclosure.

To aid in understanding the present disclosure, FIG. 1 illustrates an example system 100 comprising a plurality of different networks in which examples of the present disclosure for computing backup path configurations for a telecommunication network based upon traffic estimates for future time periods may operate. The overall communications system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/Multi-Protocol Label Switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may utilize IP routing (e.g., without MPLS). Similarly, it should be noted that examples of the present disclosure are described in connection with a Fast Reroute (FRR) implementation for MPLS-TE. However, other examples may relate to different FRR implementations, such as IP-FRR using LFA (Loop Free Alternate) paths or the like. Furthermore, network 105 may comprise multiple networks utilizing different protocols, all utilizing a shared underlying WDM infrastructure (fibers, amplifiers, ROADMs, etc.), e.g., an optical transport network. In this regard, it should be noted that as referred to herein, "traffic" (or "network traffic") may comprise all or a portion of a transmission, e.g., a sequence or flow, comprising one or more packets, segments, datagrams, frames, cells, PDUs, service data units, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may comprise wireless networks (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one example, network 105 may transport traffic to and from user devices 141 and 142. For instance, the traffic may relate to communications such as voice telephone calls, video and other multimedia, text messaging, emails, and so forth between the user devices 141 and 142, or between the user devices 141 and/or 142 and other devices that may be accessible via networks 160 and 170. User devices 141 and 142 may comprise, for example, cellular telephones, smart phones, personal computers, other wireless and wired computing devices, private branch exchanges, customer edge (CE) routers, media terminal adapters, cable boxes, home gateways, routers, and so forth.

As stated above, network 105 comprises a WDM network (e.g., a dense wavelength division multiplexing (DWDM) network). Accordingly, in one example, the nodes 131-137 may include optical components, such as ROADMs, and the links between nodes 131-137 may comprise fiber optic cables. For ease of illustration, a portion of the links is specifically labeled as links 120-129. Inset 101 illustrates a portion of the network 105 comprising nodes 136 and 137, and links 125-129. As shown in inset 101, node 136 includes a ROADM 191 coupled to links 125, 126, and 128, a plurality of add/drop ports 194, and a network switch 193 coupled to the ROADM 191 via one of the plurality of add/drop ports 194 and a transponder 192. It should be noted that the network switch 193 may include a transceiver 199 which is coupled to the transponder 192 via a fiber optic patch cord 171. The transponder 192 may include a client side transceiver 174 (which in one example may comprise the same or similar quality optics as the transceiver 199, e.g., an SFP transceiver, a 10 Gb small form factor pluggable (XFP) transceiver, or the like) and a ROADM side/line side transceiver 175 (which may comprise higher quality optics for transmitting and receiving signals over longer distances between nodes of the network 105, e.g., hundreds of kilometers up to 2,000 or more kilometers) coupled to one of the add/drop ports 194 via a fiber optic patch cord 172. In one example, the transponder 192 may comprise a muxponder that may aggregate several lower bandwidth signals from network switch 193 and/or from one or more other network switches, routers, or other client devices at node 136 into a combined signal for transmission over one of the network links 125, 126, or 128.

Similarly, node 137 includes a ROADM 195 coupled to links 126, 127, and 129, a plurality of add/drop ports 198, and a network switch 197 coupled to ROADM 195 via a patch cord 173 between one of the plurality of add/drop ports 198 and a transponder 196. It should be noted that as illustrated in FIG. 1, the transponder 196 may be integrated within network switch 197, e.g., within a pluggable slot (such as a CFP or CFP2 slot, a QSFP28 slot, or the like). In one example, transponder 196 may be capable of transmitting and/or receiving optical signals for use in metro or transport applications at data rates of 100 Gb/s or greater. However, in another example, transponder 196 may transmit and receive at lower data rates, such as 25 Gb/s, 10 Gb/s etc. ROADMs 191 and 195 may comprise colorless ROADMs, directionless ROADMs, colorless and directionless ROADMs (CD ROADMs), a contentionless ROADM, e.g., a colorless, directionless, and contentionless (CDC) ROADM, and so forth. Additionally, it should be noted that these ROADMs may include Open ROADMs with open standards allowing interoperability of different ROADMs manufactured by different vendors.

It should be noted that in each of the nodes 136 and 137, any number of routers, switches, application servers, and the like may be connected to one of the plurality of add/drop ports 194 or plurality of add/drop ports 198, e.g., via additional transponders and/or transceivers. In addition, in other examples, additional components, such as additional ROADMs, may be connected to one of the plurality of add/drop ports 194 or plurality of add/drop ports 198. For instance, in another example, node 137 may include a number of ROADMs, WSSs, and other components that are interconnected to provide a higher degree node. In addition, as referred to herein the terms "switch" and "network switch" may refer to any of a number of similar devices, e.g., including: a layer 2 switch (e.g., an Ethernet switch), a layer 3 switch/multi-layer switch, a router (e.g., a router which may also include switching functions), or the like. It should also be noted that nodes 131-135 may have a same or similar setup as nodes 136 and 137. In addition, in one example, any one or more of components 181-184 may also comprise an optical node with a same or similar setup as nodes 136 and 137.

As further illustrated in FIG. 1, network 105 includes a software defined network (SDN) controller 155 and a path computation element (PCE) 150. In one example, the SDN controller 155 may comprise a computing system or server, such as computing system 600 depicted in FIG. 6, and may be configured to provide one or more operations or functions for computing backup path configurations for a telecommunication network based upon traffic estimates for future time periods, as described herein. For instance, an illustrative method 500 for computing backup path configurations for a telecommunication network based upon traffic estimates for future time periods is described in greater detail below in connection with the example of FIG. 5. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 6 and discussed below) or multiple computing devices collectively configured to perform various steps, functions, and/or operations in accordance with the present disclosure. In addition, with respect to ROADMs, "configured" and "reconfigured" may refer to instructions to adjust a wavelength selective switch (WSS) to route different wavelengths to different fibers/links and/or to different add/drop ports. With respect to network switches and transponders, "configured" and "reconfigured" may refer to instructions to send or receive at a particular bitrate, to utilize a particular transmit power, to transmit or receive on a particular wavelength, and the like.

In one example, nodes 131-137 and components 181-184 (and/or the devices therein) may be controlled and managed by SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. Thus, various components of network 105 may comprise virtual network functions (VNFs) which may physically comprise hardware executing computer-readable/computer-executable instructions, code, and/or programs to perform various functions. For example, the functions of SDN controller 155 may include the selection of a network function virtualization infrastructure (NFVI) from among various NFVIs available at nodes 131-137 in network 105 to host various devices, such as routers, gateways, switches, route reflectors, firewalls, media servers, and so forth. To illustrate, network switches 193 and 197 may physically reside on host devices that may be configured to be a firewall, a media server, a network switch, a router, and so forth.

In addition, SDN controller 155 may also manage the operations of optical components of the network 105. For instance, SDN controller 155 may configure paths for wavelength connections via the network 105 by configuring and reconfiguring ROADMs at nodes 131-137 and components 181-184. For example, SDN controller 155 may provide instructions to control wavelength selective switches (WSSs) within the ROADMs, as well as transceivers and/or transponders connected to the ROADM add/drop ports. In one example, SDN controller 155 may maintain communications with nodes 131-137 and components 181-184 (and/or the devices therein) via a number of control links 151 which may comprise secure tunnels for signaling communications over an underling IP infrastructure of network 105, e.g., including fibers/links 120-129, etc. In other words, the control links 151 may comprise virtual links multiplexed with transmission traffic and other data traversing network 105 and carried over a shared set of physical links.

Alternatively, or in addition, the control links 151 may comprise out-of-band links, e.g., optical or non-optical connections that are different from fibers/links 120-129. In one example, SDN controller 155 may be in communication with node controllers at each node 131-137 (and in one example at components 181-184). For example, node controllers 178 and 179 may be responsible for instantiating and releasing instances of virtual machines at nodes 136 and 137 respectively, and for configuring and reconfiguring operations of associated ROADMs, such as ROADMs 191 and 195, transponders 192 and 196, transceiver 199, network switches 193 and 197, and so on. Thus, in one example, node controllers 178 and 179 may receive instructions for configuring and reconfiguring ROADMs 191 and 195 from SDN controller 155, e.g., via control links 151. Alternatively, or in addition, control links 151 may provide connections between SDN controller 155 and ROADMs 191 and 195, transponders 192 and 196, transceiver 199, and network switches 193 and 197 without the involvement of separate node controllers 178 and 179. In one example, the SDN controller 155 may also comprise a virtual machine operating on one or more NFVI/host devices, or may comprise one or more dedicated devices. For instance, SDN controller 155 may be collocated with one or more VNFs, may be deployed in one or more different host devices, or at a different physical location or locations, and so forth.

In addition, in one example, SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in an idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

As further illustrated in FIG. 1, the network 105 also includes a path computation element (PCE) 150. In one example, PCE 150 may comprise a computing system or server, such as computing system 600 depicted in FIG. 6, and may be configured to provide one or more operations or functions in accordance with the present disclosure. PCE 150 may be collocated with one or more of nodes 131-137, components 181-184, or SDN controller 155, or may be deployed at one or more different physical locations. In one example, network 105 may comprise a distributed PCE environment with multiple PCEs responsible for different zones, e.g., segregated by geographic area, by functionality type, etc. Thus, for example, PCE 150 may be selected to manage path utilizations in the portion of network 105 relating to components 181-184 and nodes 131-137. For instance, the PCE 150 may be selected by the SDN controller 155.

As illustrated in FIG. 1, PCE 150 may be in communication with SDN controller 155 and may provide path computation decisions, such as reachability determinations, to the SDN controller 155. In turn, SDN controller 155 may provision wavelength connections via paths identified by PCE 150. For instance, SDN controller 155 may receive a request to establish a wavelength connection from component 181 to component 184, e.g., to carry traffic between user devices 141 and 142. SDN controller 155 may then forward the request to PCE 150 to calculate a path. For illustrative purposes, PCE 150 may consider a candidate path (e.g., an end-to-end path) comprising links 120, 121, 122, 123, and 124, and may make a reachability determination as part of a path computation process. If the path comprising links 120, 121, 122, 123, and 124 is determined to be "reachable" and if the path satisfies other criteria, such as being a least cost path, or a path that supports a least cost route as computed at a higher layer (e.g., for IP or IP/MPLS routing), the PCE 150 may return the path to SDN controller 155 for deployment. SDN controller 155 may then communicate with the nodes 131, 132, 133, and 135, and components 181 and 184 to configure ROADMs to maintain a wavelength connection over the path. It should be noted that although nodes 131, 132, 133, and 135 may include network switches and/or routers operating in the non-optical domain, a wavelength connection via the path comprising links 120, 121, 122, 123, and 124 may be optically switched through ROADMs at nodes 131, 132, 133, and 135 (and bypassing any routers (e.g., layer 3 routers) or non-optical switches) that may be present at the respective nodes. In one example, components 181 and 184 may be configured to add and drop the wavelength of the wavelength connection and to perform optical-electrical conversion and vice versa, e.g., via a transponder coupled to an add/drop port of a ROADM therein.

In this regard, PCE 150 may store various data in connection with managing path utilizations for telecommunication network tunnels. For instance, PCE 150 may maintain a topology information block (TIB) that includes records for various links/fibers between the nodes 131-137 and components 181-184 in network 105, such as the available wavelengths, the wavelengths assigned/in-use and/or the available/free wavelengths, the paths assigned to respective wavelengths, the fiber lengths, capacities, and ages, the availability of transponders, switches, and/or other infrastructures at various nodes, transponder and/or transceiver performance capabilities of the various nodes, information regarding any protection scheme involving a fiber, and/or any particular wavelengths that may be utilized over the fiber, and so forth. In this regard, the SDN controller 155 may provide information to PCE 150 regarding the statuses of transponders, network switches, and/or ROADMs, and regarding the connections between such devices that the SDN controller 155 may obtain in the course of the performance of operations for computing backup path configurations for a telecommunication network based upon traffic estimates for future time periods, as described herein.

In one example, SDN controller 155 may gather traffic measurements from various paths (e.g., end-to-end paths) between nodes in the network 105. For instance, the traffic measurements may be obtained from one or both of the end nodes for each given end-to-end path (e.g., each tunnel). SDN controller 155 may further calculate traffic estimates for a plurality of future time periods for each of the primary paths (e.g., single links for link protection, or link pairs for router protection) in the network 105, e.g., based upon traffic estimates for each of the end-to-end paths for such future time periods. For instance, the traffic estimates for the end-to-end paths for each future time period may be calculated using a nonlinear autoregressive model, such as GPR, and the primary path traffic estimates may be determined from the various end-to-end path traffic estimates for the future time period in accordance with a topology information block (TIB) of PCE 150. For instance, the SDN controller 155 may sum the (future predicted) traffic for each end-to-end path traversing a link to determine a (future predicted) link traffic (and similarly for two-link primary paths for router protection schemes).

In one example, the SDN controller 155 may also calculate and recalculate backup path configurations for network element failure conditions (e.g., for link protection and/or node protection) based upon the estimated primary path traffic, determine if there are backup path configuration changes (e.g., from one or more previously calculated backup path configurations), and then adjust any backup paths for which a change is noted. In accordance with the present disclosure, such changes may include rerouting of one or more backup paths over fixed IP links, as well as creating or deleting wavelength connections that may support various IP links with CD ROADMs, DFCC (digital fiber cross connects), and so forth based on the changing traffic conditions or other conditions of network 105, such as scheduled maintenance or bandwidth scheduling, and so forth.

It should be noted that the system 100 has been simplified. In other words, the system 100 may be implemented in a different form than that illustrated in FIG. 1. For example, the system 100 may be expanded to include additional networks, such as NOC networks, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, SDN controller 155, PCE 150, and/or other network elements may comprise functions that are spread across several devices that operate collectively as a SDN controller, a PCE, etc. In another example, PCE 150 and SDN controller 155 may be integrated into a single device. In another example, PCE 150 may maintain its own connections to nodes 131-137 and components 181-184 and may send instructions to various devices to configure wavelength connections in accordance with the present disclosure. In still another example, SDN controller 155 and/or PCE 150 may calculate and recalculate secondary end-to-end paths which may be implemented after a FRR activation of a backup path. For instance, SDN controller 155 may provide a path traffic matrix and/or a link traffic vector for one or more future time periods which PCE 150 may utilize to select secondary end-to-end paths (e.g., backup paths) which may be activated in response to failure conditions affecting network element(s) on primary end-to-end paths (e.g., tunnels). For example, a FRR backup path may be used initially in response to a failure condition affecting a link or node in the path/tunnel, while the secondary end-to-end path may be activated thereafter. Thus, these and other modifications of the system 100 are all contemplated within the scope of the present disclosure.

Figure 2:
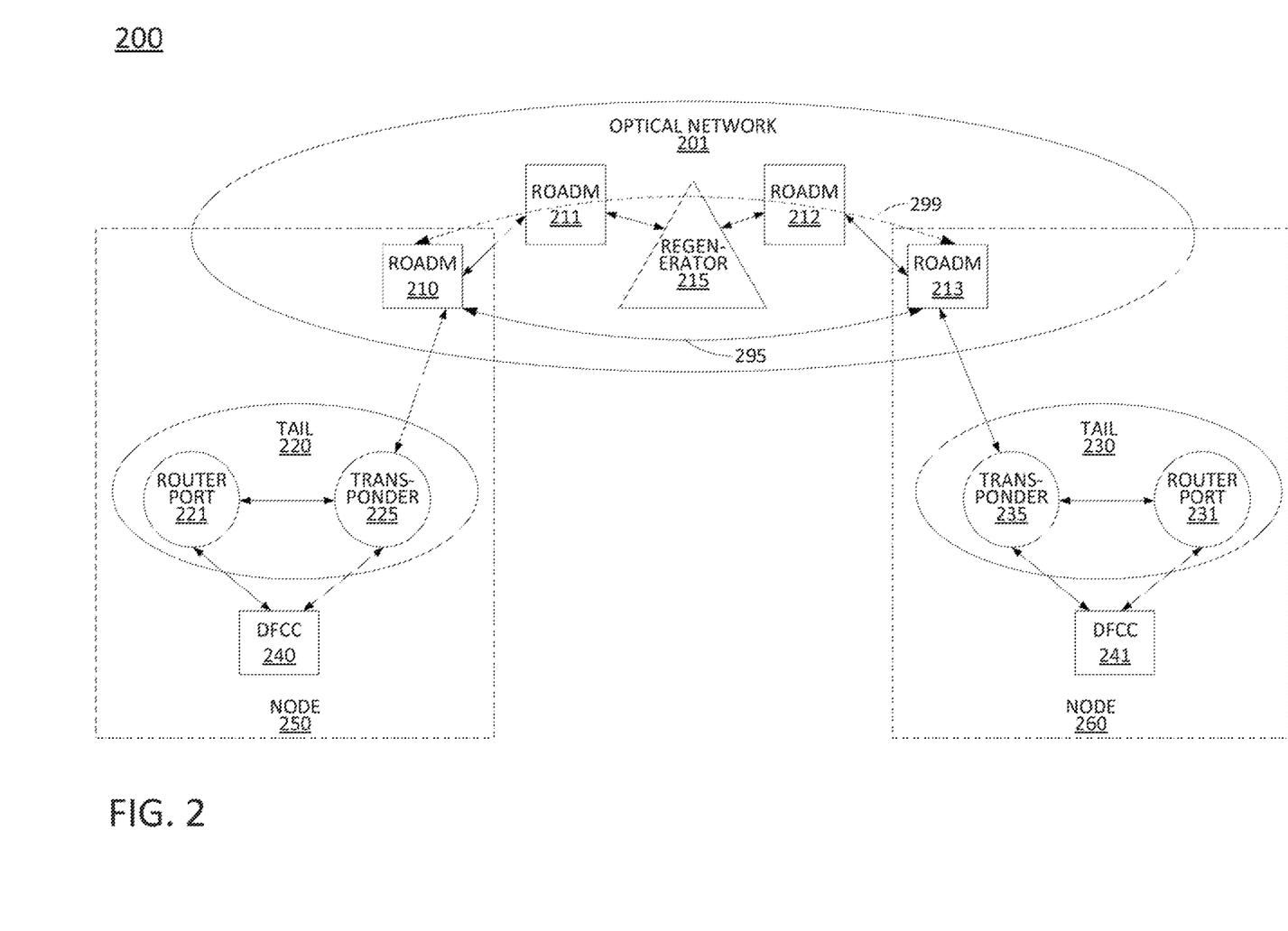
FIG. 2 illustrates an additional example system related to the present disclosure.

FIG. 2 illustrates an additional example system 200 in which examples of the present disclosure for computing backup path configurations for a telecommunication network based upon traffic estimates for future time periods may operate. As illustrated in FIG. 2, the system 200 includes an optical network 201, and nodes 250 and 260, which may include optical components and non-optical components. For example, node 250 includes ROADM 210 as well as transponder 225, dynamic fiber cross connect (DFCC) 240, and router port 221. Similarly, node 260 includes ROADM 213, transponder 235, router port 231, and DFCC 241. Collectively, router port 221 and transponder 225 may be referred to as a "tail" 220. Likewise, router port 231 and transponder 235 may be referred to as a "tail" 230. Transponders 225 and 235 are used in the two locations of node 250 and node 260, respectively, for electrical-to-optical and optical-to-electrical signal conversions.

The system 200 may represent similar components of the system 100. For instance, nodes 250 and 260 may correspond to any one of nodes 131-137 and/or components 181-184. As further illustrated in FIG. 2, optical network 201 may include ROADMs 211 and 212, and a regenerator 215. There may be many additional ROADMs in the optical network 201 (not shown). Regenerator 215 may be used to boost signal strength if the distance from ROADM 211 to ROADM 212 is beyond the transponders' and/or the fibers' optical reach.

These components are intended to illustrated that additional optical components may exist between nodes in the network and may comprise network resources of a link that may be controllable in connection with examples of the present disclosure for computing backup path configurations for a telecommunication network based upon traffic estimates for future time periods. For instance, the wavelength connection 295 may represent a wavelength connection over a physical fiber between ROADM 210 and ROADM 213, which may support an IP link between router port 221 (and/or node 250) and router port 231 (and/or node 260). A backup path for this link between the nodes/routers may traverse another node/router at a different location (not shown). However, in accordance with the present disclosure, a backup path may be configured by providing additional resources to an existing IP link or creating a new IP link. For instance, an additional IP link between router ports 221 and 231 (and/or between nodes 250 and 260) may be established over a new/different wavelength connection 299 via ROADMs 210-213 and regenerator 215. In addition, the IP link over wavelength connection 299 may be used for a backup path as described herein.

In one example, the DFCCs 240 and 241 may be used to connect two components of the respective tails 220 and 230 in the same location. There may be many router ports and transponders in the same location (not shown in the figure) and the DFCCs 240 and 241 may be used to connect any router port to any transponder in the same tail, and to dynamically rearrange the connections, e.g., following a traffic change or failure event.

With an SDN controller or a system of federated SDN controllers managing both the packet network and the ROADM network in accordance with the present disclosure, the three components, tail 220, tail 230, and regenerator 215 are disaggregated, interoperable, and the non-failed components can be reused in the event of a failure condition affecting one of the components. Furthermore, the DFCCs 240 and 241 also disaggregate the two components of the respective tails 220 and 230, and if one of the components fails (e.g., router port 221 or transponder 225 in tail 220, or router port 231 or transponder 235 in tail 230), the non-failed component can be reused and combined with another component of the opposite type to form a new tail.

Figure 3:
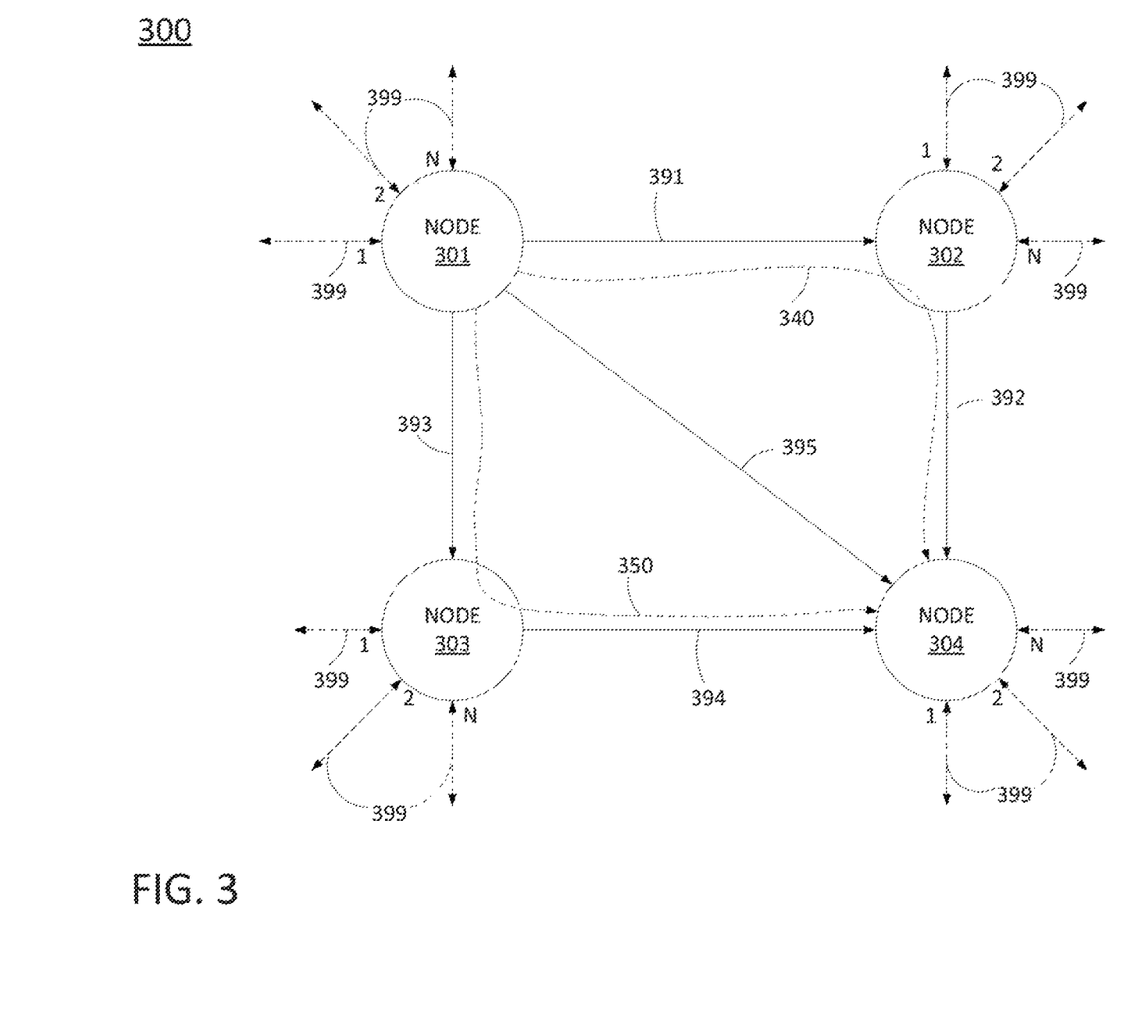
FIG. 3 illustrates a portion of a network related to the present disclosure.

FIG. 3 illustrates a portion of a network 300 in which examples of the present disclosure for computing backup path configurations for a telecommunication network based upon traffic estimates for future time periods may operate. As shown in FIG. 3, the network 300 includes four nodes 301-304 (e.g., comprising switches and/or routers, or the like). The nodes 301-304 are interconnected via a plurality of links 391-395 (e.g., IP links). The network 300 may represent similar components of the system 100 or system 200. For instance, nodes 301-304 may correspond to any one of the nodes 131-137 and/or components 181-184 of FIG. 1, or any one of the nodes 250 or 260 of FIG. 2. FIG. 3 further illustrates a plurality of links 399 which may interconnect nodes 301-304 to other nodes of the network 300 (not shown). For instance, each of nodes 301-304 may have any number of additional links 1 to N depending upon the particular configuration/topology of network 300. It should be noted that for illustrative purposes, nodes 301-304 are connected via unidirectional links 391-395. However, the network 300 may include reverse links (not shown) among nodes 301-304 which are complementary to links 391-395 (i.e., in the opposite directions).

Figure 4:
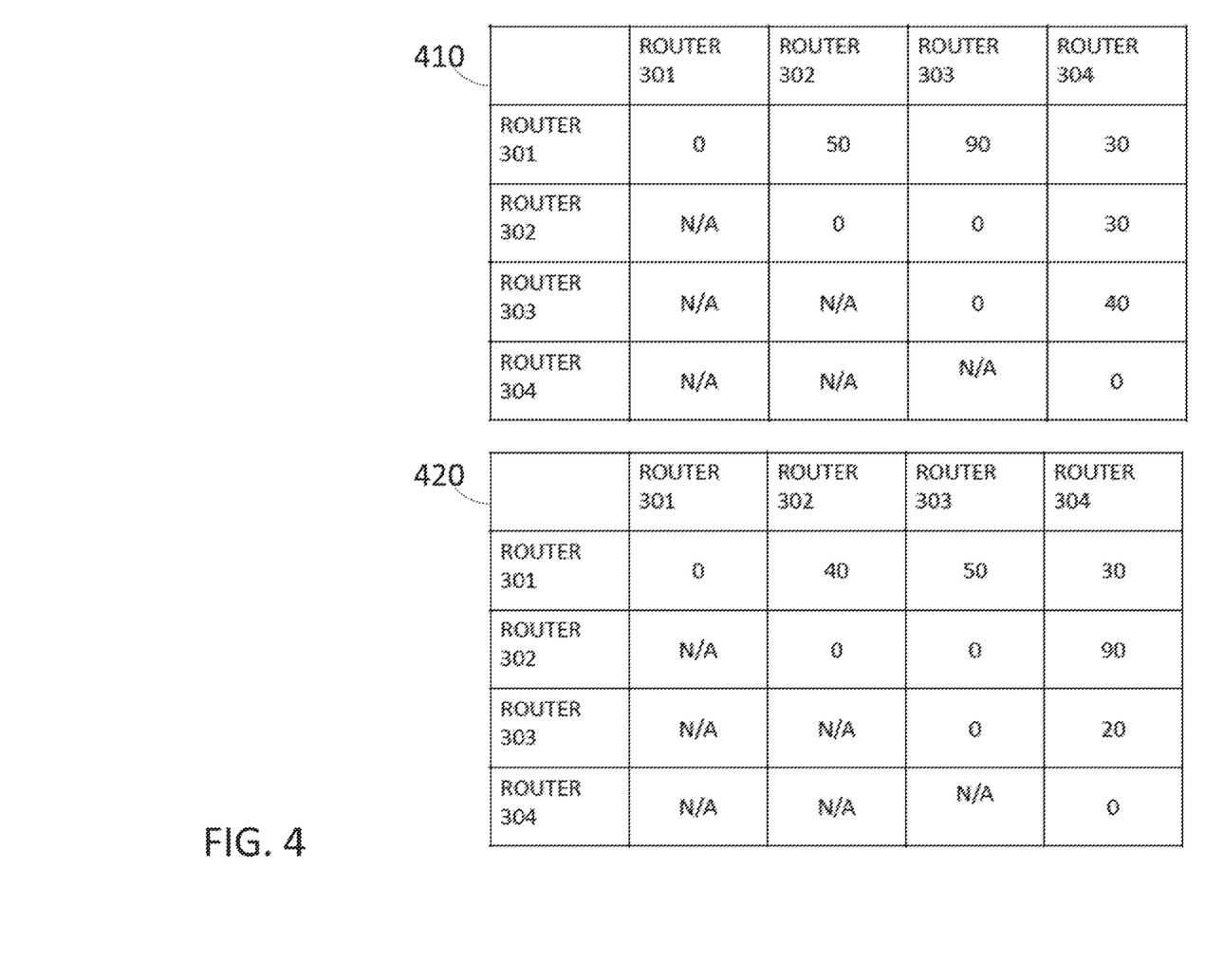
FIG. 4 illustrates a link traffic vector at different time periods.

FIG. 4 illustrates a primary path traffic vector (e.g., a link traffic vector) at different time periods for the portion of the network 300 shown in FIG. 3. For instance, link traffic vector 410 may comprise the link traffic predictions among nodes 301-304 for a time period on a weekday afternoon, while link traffic vector 420 may comprise the link traffic predictions among nodes 301-304 for a time period on a weekday evening. In the present example, it may be assumed that each link can have a capacity in multiples of 100 Gbps and that the current capacity of each link is 100 Gbps. In addition, the present example may involve calculating a backup path for link 395 from node 310 to node 304. Given the topology of network 300, there are two possible options for a backup path for link 395: the path 340 and the path 350. As can be seen in FIG. 4, the estimated traffic for link 395 is 30 Gbps at both time periods (e.g., in both traffic matrix 410 and traffic matrix 420). Therefore, the backup path should have a spare capacity of at least 30 Gbps in order to avoid traffic loss immediately following a failure of link 395. For any link, the spare capacity is defined as the available extra capacity after carrying normal traffic on that link. In addition, spare capacity of a path is the minimum of the spare capacities among all links along the path.

At different times of day, days of the week, and so on, the available spare capacity on each link changes. For instance, during an afternoon peak traffic period (e.g., corresponding to traffic matrix 410) the potential backup path 340 has a spare capacity of 50 Gbps. In particular, link 391 has a predicted traffic utilization of 50 Gbps (and thus a predicted spare capacity of 50 Gbps), while link 392 has a predicted traffic utilization of 30 Gbps (and thus a predicted spare capacity of 70 Gbps). The minimum spare capacity among these links is 50 Gbps, and therefore the available spare capacity of potential backup path 340 is 50 Gbps during the afternoon time period. In a similar way, the available spare capacity of potential backup path 350 during the afternoon time period may be calculated as 10 Gbps, which is insufficient to support the predicted traffic of 30 Gbps on link 395. On the other hand, during the evening time period (corresponding to the traffic matrix 420), the potential backup path 340 is predicted to have an available spare capacity of 10 Gbps (which is insufficient to support the predicted traffic of 30 Gbps on link 395), while the potential backup path 350 is predicted to have an available spare capacity of 50 Gbps.

If the path 340 is used statically as the backup path for link 395 and a failure occurs on link 395 during evening hours, then 20 Gbps of traffic may be lost or unsupported. Similarly, if path 350 is used statically as the backup path for link 395 and a failure occurs on link 395 during afternoon hours, then 20 Gbps of traffic may be lost or unsupported. In order to avoid traffic loss, one of the paths can be chosen for the backup and extra capacity of 100 Gbps may be added along that path (e.g., assuming 100 Gbps to be the minimum unit for capacity addition). Note that in the present example, at least two links would need to be augmented by 100 Gbps for whichever of the potential backup paths (340 or 350) is selected.

However, with a view of the future predicted traffic conditions illustrated by traffic matrix 410 and traffic matrix 420, in accordance with the present disclosure a more optimal backup path configuration may be calculated for each time interval/time period, and the backup path configuration may be implemented within the network 300 in advance of such time periods. For instance, every 15 minutes, every hour, etc., a backup path configuration may be calculated for a future time period, e.g., 15 minutes later, 30 minutes later, etc. When the backup path configuration changes, the network 300 may switch the backup path to the new configuration. For instance, just before the a peak afternoon traffic period (corresponding to traffic matrix 410), the network 300 may allocate the backup path for link 395 to path 340, and just before a peak evening traffic period (corresponding to traffic matrix 420) the network 300 may allocate the backup path for link 395 to path 350, thereby avoiding traffic loss on the backup path no matter when a failure on link 395 may happen, and without using any extra capacity.

The foregoing example is described in connection with calculating a backup path configuration for a single link 395, and without regard to any QoS (Quality of Service) classes. However, it should be noted that configurations for backup paths for each direction of each link in a network (which may be several hundred links in a large telecommunication network), and for each class, may be calculated for each time period. For example, an end-to-end path traffic matrix may include KN(N−1) elements and a link traffic vector may include KNM elements where K is the number of QoS classes, N is the number of traffic endpoints/nodes/routers in the network and M is the average number of links out of every router. As an example, if K=2, N=50 and M=4 then the number of elements of the end-to-end path traffic matrix is 4900 and that of the link traffic vector is 400. In addition, a primary path traffic vector for a node/router protection scheme may be similarly calculated in accordance with the foregoing. For instance, each element of a primary path traffic vector may represent traffic on a two-link primary path traversing a node and may be similarly calculated from the predicted end-to-end path traffic and in accordance with the network topology.

Figure 5:
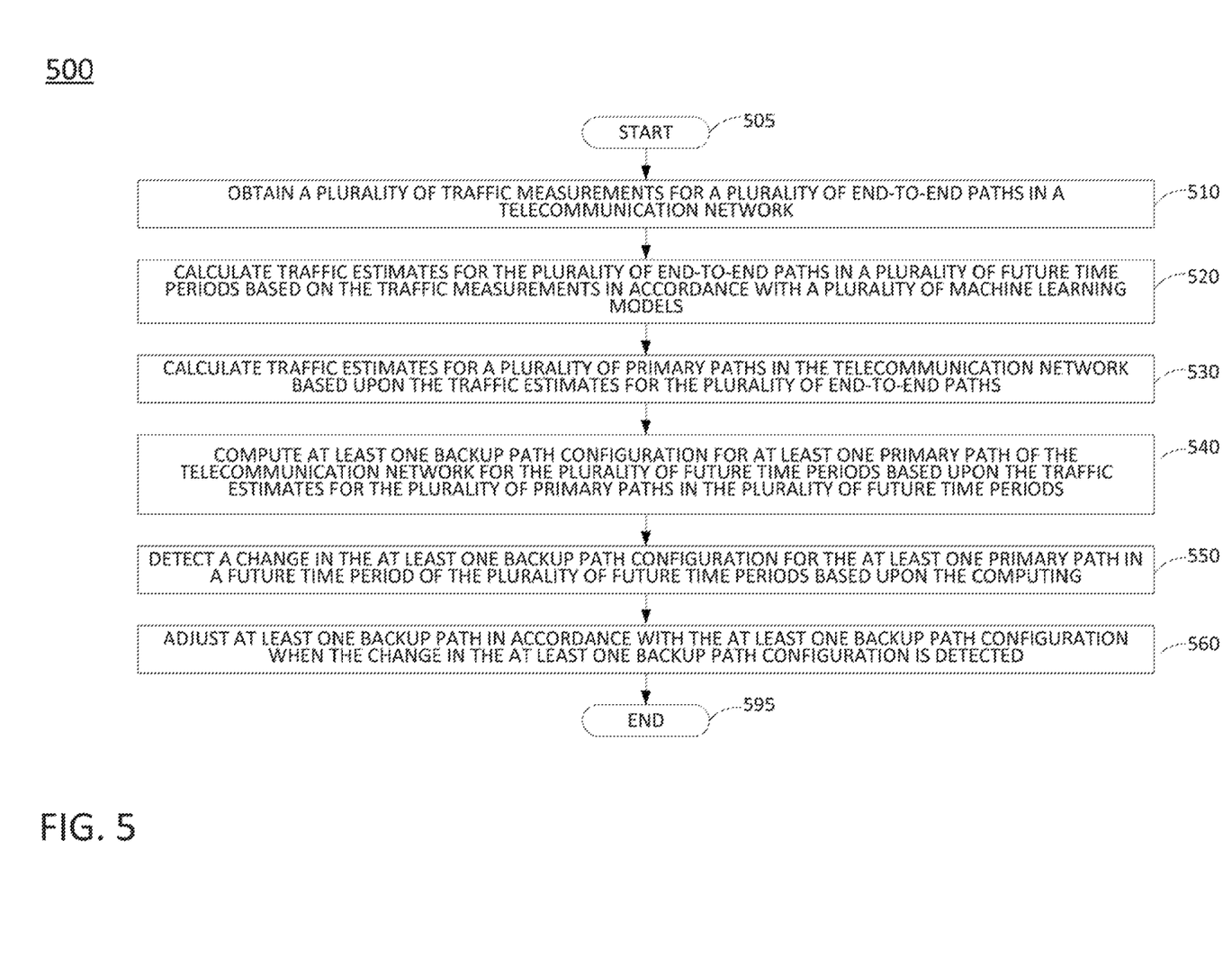
FIG. 5 illustrates an example method for computing backup path configurations for a telecommunication network based upon traffic estimates for future time periods, in accordance with the present disclosure.
Figure 6:
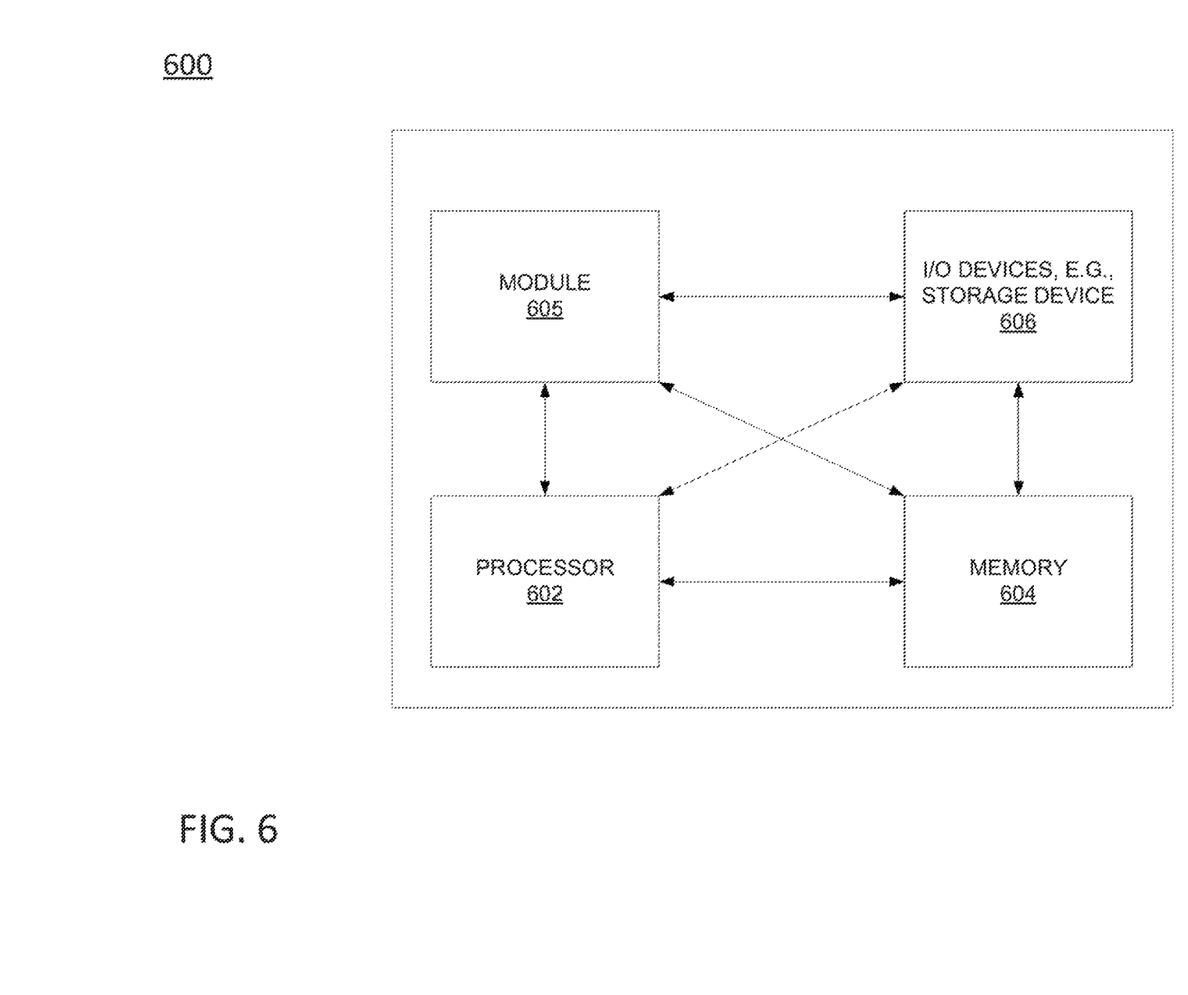
FIG. 6 illustrates an example high-level block diagram of a computer specifically programmed to perform the steps, functions, blocks, and/or operations described herein.

FIG. 5 illustrates a flowchart of an example method 500 for computing backup path configurations for a telecommunication network based upon traffic estimates for future time periods. In one example, steps, functions and/or operations of the method 500 may be performed by a network-based device, such as SDN controller 155 in FIG. 1, or any one or more components thereof, such as a processing system. Alternatively, or in addition, the steps, functions and/or operations of the method 500 may be performed by a processing system collectively comprising a plurality of devices as illustrated in FIG. 1, such as SDN controller 155, PCE 150, ROADM 191 and/or ROADM 195, network switches 193 and/or 197, node controllers 178 and/or 179, and so forth. In one example, the steps, functions, or operations of method 500 may be performed by a computing device or system 600, and/or a processing system 602 as described in connection with FIG. 6 below. For instance, the computing device 600 may represent at least a portion of a SDN controller, in accordance with the present disclosure. For illustrative purposes, the method 500 is described in greater detail below in connection with an example performed by a processing system, such as processing system 602, or a processing system comprising a plurality of devices. The method 500 begins in step 505 and proceeds to step 510.

At step 510, the processing system obtains a plurality of traffic measurements for a plurality of end-to-end paths in a telecommunication network. In one example, each of the plurality of end-to-end paths may comprise a MPLS tunnel. In one example, the traffic measurements may be obtained by the processing system from the tunnel endpoints/nodes.

At step 520, the processing system calculates traffic estimates for the plurality of end-to-end paths at the future time period(s) based on the traffic measurements in accordance with at least one machine learning model. In one example, the at least one machine learning model may comprise a plurality of machine learning models, e.g., a plurality of nonlinear autoregressive models, one for each time range to be forecasted, where the traffic estimates for the plurality of end-to-end paths are calculated in accordance with the plurality of nonlinear autoregressive models. For instance, the plurality of nonlinear autoregressive models may be formed by using Gaussian process regression to determine the nonlinear relationships between the past and future time periods in each model. In this example, at least a portion of the plurality of traffic measurements obtained at step 510 may be used as training data to train the plurality of nonlinear autoregressive models. In one example, each of the plurality of nonlinear autoregressive models is associated with a respective one of the plurality of end-to-end paths and is separately trained from at least a portion of the plurality of traffic measurements that is obtained for the one of the plurality of end-to-end paths.

In one example, each of the plurality of nonlinear autoregressive models generates a traffic estimate for one of the plurality of end-to-end paths for the future time period(s) in accordance with a function of the plurality of traffic measurements from the plurality of end-to-end paths at a plurality of previous time periods. In addition, in one example, each of the plurality of nonlinear autoregressive models generates a traffic estimate for one of the plurality of end-to-end paths for the future time period(s) in further accordance with a linear trend factor.

In one example, for each of the plurality of nonlinear autoregressive models, a previous time period of the plurality of previous time periods is selected for inclusion in the plurality of previous time periods when a partial autocorrelation of the training data associated with the previous time period exceeds a threshold. The threshold may be dependent upon the range between the future time period to be forecasted and the current time period. For instance, the threshold may be decreased (resulting in more lags chosen in the model) for longer-range forecasts and may be increased (resulting in fewer lags chosen in the model) for shorter-range forecasts. In one example, the reference time period may comprise a most recent time period for which the plurality of traffic measurements is obtained (e.g., as close to a current time period as is possible).

Step 520 may also include computing an end-to-end path traffic matrix having rows and columns corresponding to nodes in the telecommunication network. In one example, each entry of a plurality of entries in the end-to-end path traffic matrix represents a traffic estimate for one of the plurality of end-to-end paths comprising a path between two of the nodes in the telecommunication network.

At step 530, the processing system calculates traffic estimates for a plurality of primary paths in the telecommunication network based upon the traffic estimates for the plurality of end-to-end paths. For example, the processing system may utilize a network routing mechanism (e.g., network topology information, such as a TIB) to calculate traffic estimates for a plurality of links (or a pair of links, for node/router protection) from the traffic estimates of end-to-end paths. In one example each of the plurality of primary paths comprises a link between adjacent nodes in the telecommunication network, or a node and two links connected to the node in the telecommunication network. In one example, step 530 may include computing a primary path traffic vector having rows and columns corresponding to a subset of the nodes in the telecommunication network, where each entry of a plurality of entries in the primary path traffic vector represents a traffic estimate for one of the plurality of primary paths in the telecommunication network. In one example, the subset of the nodes comprises nodes that are in source-destination node pairs of the plurality of primary paths. In addition, in one example, the primary path traffic vector may be computed from the end-to-end path traffic matrix in accordance with a routing engine mapping of the plurality of end-to-end paths in the telecommunication network.

At step 540, the processing system computes at least one backup path configuration for at least one primary path of the telecommunication network for the plurality of future time periods based upon the traffic estimates (e.g., at least one of the traffic estimates) for the plurality of primary paths in the plurality of future time periods. For instance, the backup path may be a FRR backup path for link protection or node protection. In one example, the at least one backup path configuration may be computed based upon the primary path traffic vector comprising the traffic estimates for the plurality of primary paths at the future time period(s). The primary paths are over a single link in the link protection case and over two links in the router protection case.

At least one backup path configuration may be calculated in accordance with a path optimization algorithm based upon the primary path traffic estimates for one or more of the future time periods. For instance, primary paths may be selected using a shortest path first (SPF) algorithm (which may include additional constraints). As just one example, candidate backup paths may then be selected from a second shortest path, a third shortest path, etc. that are diverse from the primary path. It should be noted that the second shortest path may change from time period to time period, e.g., as the predicted end-to-end path traffic matrix changes. Thus, the second shortest path (e.g., with additional resource constraints) for each primary path to be protected may be selected as the backup path configuration. Various additional methodologies for selecting backup path configurations may be implemented at step 530 in accordance with the present disclosure. In addition, in accordance with the present disclosure, the paths to be considered as candidate backup paths may include non-active paths or links, and/or paths or links which may be established within an L0-L3 SDN architecture, but which are not currently active.

At step 550, the processing system detects a change in the at least one backup path configuration for the at least one primary path in a future time period of the plurality of future time periods based upon the computing. For instance, the processing system may maintain a set of backup path configurations for various primary paths in the telecommunication network, such as in a topology information block (TIB) and/or routing engine mapping. As such, the processing system may detect any changes, e.g., from one time period to the next, among any one or more of the backup paths.

At step 560, the processing system adjusts at least one backup path in accordance with at least one backup path configuration when the change in at least one backup path configuration is detected (based on traffic-change-based computation). In one example, the adjusting is performed at a designated time in advance of the future time period, e.g., 20 minutes in advance of the future time period, 15 minutes in advance of the future time period, etc. In one example, step 550 may include at least one of: providing additional capacity to an existing set of resources for the at least one backup path, or changing the existing set of resources for the at least one backup path to a different set of resources. For instance, changing the existing set of resources for the at least one backup path to a different set of resources may include assigning the at least one backup path to at least one different link or at least one different node of the telecommunication network that is not in the existing set of resources. Alternatively, or in addition, changing the existing set of resources for the at least one backup path to a different set of resources may comprise activating the at least one different link in the network via at least one of: at least one reconfigurable optical add-drop multiplexer, or at least one fiber cross-connect. In one example, the processing system may instruct one or more other network elements to effectuate the adjusting of the backup path. For instance, the processing system may instruct one or more nodes (or components thereof, such as switches/routers, node controllers, DFCC, ROADMs, regenerators, and so forth) to turn up a wavelength connection, to allocate more or less bandwidth to one or more links for the backup path, to reconfigure operational state(s) to utilize the new backup path configuration instead of an old backup path configuration (e.g., to route traffic to a different link in the event of a failure on the protected link), and so forth.

Following step 560 the method 500 proceeds to step 595. At step 595, the method 500 ends.

It should be noted that the method 500 may be expanded to include additional steps, or may be modified to replace steps with different steps, to combine steps, to omit steps, to perform steps in a different order, and so forth. For instance, in one example, the method 500 may be repeated for one or more additional time periods. In one example, a backup path for which a configuration is computed at step 540 may be a secondary end-to-end path for one of the plurality of paths (e.g., MPLS tunnels). In one example, the backup path configuration(s) computed at step 540 can also be based upon other factors in addition to forecast traffic, such as node/processor load, scheduled maintenance events at nodes or links, and so on. In addition, in one example, step 560 may further include provisioning or reconfiguring VNFs and/or NFVI within the network to host new routers/switches and to include such newly instantiated network element(s) into one or more backup paths. In one example, a network failure is detected and one or more of the adjusted backup paths are used as backup path(s) responsive to the detected network failure. Thus, these and other modifications are all contemplated within the scope of the present disclosure.

In addition, although not specifically specified, one or more steps, functions or operations of the method 500 may include a storing, displaying, and/or outputting step as required for a particular application. In other words, any data, records, fields, and/or intermediate results discussed in the example method 500 can be stored, displayed, and/or outputted to another device as required for a particular application. Furthermore, steps or blocks in FIG. 5 that recite a determining operation or involve a decision do not necessarily require that both branches of the determining operation be practiced. In other words, one of the branches of the determining operation can be deemed as an optional step. In addition, one or more steps, blocks, functions, or operations of the above described method 500 may comprise optional steps, or can be combined, separated, and/or performed in a different order from that described above, without departing from the examples of the present disclosure.

FIG. 6 depicts a high-level block diagram of a computing device or processing system specifically programmed to perform the functions described herein. As depicted in FIG. 6, the processing system 600 comprises one or more hardware processor elements 602 (e.g., a central processing unit (CPU), a microprocessor, or a multi-core processor), a memory 604 (e.g., random access memory (RAM) and/or read only memory (ROM)), a module 605 for computing backup path configurations for a telecommunication network based upon traffic estimates for future time periods, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 606 may also include antenna elements, transceivers, power units, and so forth. Although only one processor element is shown, it should be noted that the computing device may employ a plurality of processor elements. Furthermore, although only one computing device is shown in the figure, if the method 500 as discussed above is implemented in a distributed or parallel manner for a particular illustrative example, i.e., the steps of the above method 500, or the entire method 500 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the methods discussed above can be used to configure a hardware processor to perform the steps, functions and/or operations of the above disclosed method 500. In one example, instructions and data for the present module or process 605 for computing backup path configurations for a telecommunication network based upon traffic estimates for future time periods (e.g., a software program comprising computer-executable instructions) can be loaded into memory 604 and executed by hardware processor element 602 to implement the steps, functions, or operations as discussed above in connection with the illustrative method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for computing backup path configurations for a telecommunication network based upon traffic estimates for future time periods (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    calculating, by a processing system including at least one processor, at least one traffic estimate for a plurality of primary paths in a telecommunication network based upon traffic estimates for a plurality of end-to-end paths in the telecommunication network in at least one future time period;
    computing, by the processing system, at least one backup path configuration for at least one primary path of the telecommunication network for the at least one future time period based upon the at least one traffic estimate for the plurality of primary paths in the at least one future time period;
    detecting, by the processing system, a change in the at least one backup path configuration for the at least one primary path in a future time period of the at least one future time period based upon the computing; and
    adjusting, by the processing system, at least one backup path in accordance with the at least one backup path configuration when the change in the at least one backup path configuration is detected.

2. The method of claim 1, wherein the adjusting is performed at a designated time in advance of the future time period.

3. The method of claim 1, wherein each of the plurality of primary paths comprises:
    a link between adjacent nodes in the telecommunication network; or
    a node, and two links connected to the node in the telecommunication network.

4. The method of claim 1, wherein each of the plurality of end-to-end paths comprises a multiprotocol label switching tunnel.

5. The method of claim 1, wherein the calculating the at least one traffic estimate for the plurality of primary paths further comprises:
    computing a primary path traffic vector having rows and columns corresponding to a subset of nodes in the telecommunication network, wherein each entry of a plurality of entries in the primary path traffic vector represents a traffic estimate for one of the plurality of primary paths in the telecommunication network.

6. The method of claim 5, wherein the primary path traffic vector is computed from an end-to-end path traffic matrix in accordance with a routing engine mapping of the plurality of end-to-end paths in the telecommunication network, wherein the at least one backup path configuration is computed based upon the primary path traffic vector comprising the at least one traffic estimate for the plurality of primary paths at the future time period.

7. The method of claim 1, wherein the adjusting the at least one backup path comprises:
    providing an additional capacity to an existing set of resources for the at least one backup path; or
    changing the existing set of resources for the at least one backup path to a different set of resources.

8. The method of claim 7, wherein the changing the existing set of resources for the at least one backup path to the different set of resources comprises:

assigning the at least one backup path to at least one different link or at least one different node of the telecommunication network that is not in the existing set of resources.

9. The method of claim 8, wherein the changing the existing set of resources for the at least one backup path to the different set of resources further comprises:
   activating the at least one different link in the telecommunication network via at least one of:
      at least one reconfigurable optical add-drop multiplexer; or
      at least one fiber cross-connect.

10. A non-transitory computer-readable medium storing instructions which, when executed by a processing system including at least one processor, cause the processing system to perform operations, the operations comprising:
   calculating at least one traffic estimate for a plurality of primary paths in a telecommunication network based upon traffic estimates for a plurality of end-to-end paths in the telecommunication network in at least one future time period;
   computing at least one backup path configuration for at least one primary path of the telecommunication network for the at least one future time period based upon the at least one traffic estimate for the plurality of primary paths in the at least one future time period;
   detecting a change in the at least one backup path configuration for the at least one primary path in a future time period of the at least one future time period based upon the computing; and
   adjusting at least one backup path in accordance with the at least one backup path configuration when the change in the at least one backup path configuration is detected.

11. The non-transitory computer-readable medium of claim 10, wherein the adjusting is performed at a designated time in advance of the future time period.

12. The non-transitory computer-readable medium of claim 10, wherein each of the plurality of primary paths comprises:
   a link between adjacent nodes in the telecommunication network; or
   a node, and two links connected to the node in the telecommunication network.

13. The non-transitory computer-readable medium of claim 10, wherein each of the plurality of end-to-end paths comprises a multiprotocol label switching tunnel.

14. The non-transitory computer-readable medium of claim 10, wherein the calculating the at least one traffic estimate for the plurality of primary paths further comprises:
   computing a primary path traffic vector having rows and columns corresponding to a subset of nodes in the telecommunication network, wherein each entry of a plurality of entries in the primary path traffic vector represents a traffic estimate for one of the plurality of primary paths in the telecommunication network.

15. The non-transitory computer-readable medium of claim 14, wherein the primary path traffic vector is computed from an end-to-end path traffic matrix in accordance with a routing engine mapping of the plurality of end-to-end paths in the telecommunication network, wherein the at least one backup path configuration is computed based upon the primary path traffic vector comprising the at least one traffic estimate for the plurality of primary paths at the future time period.

16. The non-transitory computer-readable medium of claim 10, wherein the adjusting the at least one backup path comprises:
   providing an additional capacity to an existing set of resources for the at least one backup path; or
   changing the existing set of resources for the at least one backup path to a different set of resources.

17. The non-transitory computer-readable medium of claim 16, wherein the changing the existing set of resources for the at least one backup path to the different set of resources comprises:
   assigning the at least one backup path to at least one different link or at least one different node of the telecommunication network that is not in the existing set of resources.

18. The non-transitory computer-readable medium of claim 17, wherein the changing the existing set of resources for the at least one backup path to the different set of resources further comprises:
   activating the at least one different link in the telecommunication network via at least one of:
      at least one reconfigurable optical add-drop multiplexer; or
      at least one fiber cross-connect.

19. An apparatus comprising:
   a processing system including at least one processor; and
   a non-transitory computer-readable medium storing instructions which, when executed by the processing system, cause the processing system to perform operations, the operations comprising:
      calculating at least one traffic estimate for a plurality of primary paths in a telecommunication network based upon traffic estimates for a plurality of end-to-end paths in the telecommunication network in at least one future time period;
      computing at least one backup path configuration for at least one primary path of the telecommunication network for the at least one future time period based upon the at least one traffic estimate for the plurality of primary paths in the at least one future time period;
      detecting a change in the at least one backup path configuration for the at least one primary path in a future time period of the at least one future time period based upon the computing; and
      adjusting at least one backup path in accordance with the at least one backup path configuration when the change in the at least one backup path configuration is detected.

20. The apparatus of claim 19, wherein each of the plurality of primary paths comprises:
   a link between adjacent nodes in the telecommunication network; or
   a node, and two links connected to the node in the telecommunication network.

* * * * *